United States Patent [19]
Hof

[11] 3,736,827
[45] June 5, 1973

[54] DEVICE FOR MANUFACTURING A PAIR OF ANNULAR MEMBERS FROM A PREFORMED BLANK

[75] Inventor: Bruno Hof, Ch-4142 Munchenstein, Switzerland

[73] Assignee: F.B. Hatebur AG, Basle, Switzerland

[22] Filed: Dec. 30, 1971

[21] Appl. No.: 214,175

[30] Foreign Application Priority Data
Dec. 30, 1970 Germany.................P 20 64 440.0

[52] U.S. Cl. .....................83/126, 83/621, 83/622, 83/623
[51] Int. Cl. ..............................................B26f 1/14
[58] Field of Search......................83/126, 621, 622, 83/623

[56] References Cited
UNITED STATES PATENTS
3,602,078  8/1971  Schindler..........................83/621 X

*Primary Examiner*—J. M. Meister
*Attorney*—Neil F. Markva and John C. Smith Jr.

[57] ABSTRACT

This invention relates to a device for manufacturing two annular members capable of fitting one within the other, from a preformed blank in the form of a cup-shaped inner part integral with and axially displaced relative to an outer annular part. The apparatus includes two co-operating die and punch members for respectively separating the two annular parts and for perforating the inner cup-shaped part. Further, a fluid actuated arrangement is provided for controlling movement of the die members during operation of the apparatus.

10 Claims, 6 Drawing Figures

DEVICE FOR MANUFACTURING A PAIR OF ANNULAR MEMBERS FROM A PREFORMED BLANK

BACKGROUND OF THE INVENTION

The invention relates to a device for the manufacture of two hollow articles such as rings. The articles fit into one another and each has one hole passing through it. The manufacturing blank contains the two preformed hollow articles connected to one another by a strip running practically at right angles to the longitudinal axis of the blank in a stepwise arrangement. The two hollow articles are separated from one another, and the smaller hollow articles are perforated by the application of axially directed shear forces onto the manufacturing blanks.

A prior art apparatus used to manufacture articles such as these includes a punch body carried on a reciprocating carriage and a die body located coaxially opposite the punch body. A perforating die is carried within the die body and is displaceable in the direction of motion of the punch. The punch body comprises a cutting-out punch and a tubular separating punch which is carried so that it can slide on the outer surface of the cutting-out punch. The separating punch is connected to the cutting-out punch by an elastic member which seeks constantly to press the separating punch into its terminal position adjacent to the die. The perforating die is in the shape of a sleeve and is carried so as to be displaceable in the bore of a separating die that is located in a fixed position in the die holder.

Such a prior art device, which is intended, inter alia, to contribute a considerable simplification in the manufacture of roller bearings, forms the subject of German Patent No. 19, 40, 379 dated Feb. 26, 1970. However, the embodiment described therein is intended particularly for large presses in which a separately actuated ejector is also provided for each conversion station. For smaller machines, which possess, for the ejectors of all conversion stations, a conjoint actuating member, for example a reciprocating rod running at right angles to the ejector axes, a different solution therefore had to be sought.

In the known prior art embodiments, a further disadvantage which manifests itself is that the control cams on the punch side and on the die side are subjected to severe alternating stresses because they have to absorb and transmit the forces arising during perforation and separation over a very small surface.

PURPOSE OF THE INVENTION

The primary object of this invention is to provide a device which can be used for any desired size of machine having one or more working stations and having separate or conjoint ejector actuation, the forces arising therein being transmitted by way of the hydraulic medium to the die housing and from the latter to the machine frame.

Another object of this invention is to provide a device which may be built in combination with existing machines by simple means and without significant constructional expenditure and, in particular, with the avoidance of complicated transmission members.

SUMMARY OF THE INVENTION

The disadvantages of the prior art structure have been overcome through the use of a hydraulic control means used for controlling movement of a perforating die member carried within a reciprocatable die body. The angular, perforating die surface which faces away from the punch body is exposed to the pressure of a hydraulic medium. The hydraulic medium is disposed in the fluid chamber connected to a source of hydraulic pressure by way of a control member. A cam-control rod is displaceably located in the bore of the perforating die. The rod has a longitudinal bore provided with two lateral orifices. The position of the orifices is so chosen that the orifice on the punch side is closed during the punching process by the adjacent wall of the bore of the perforating die. However, after the punching process, the orifice is connected to the fluid chamber containing the hydraulic medium and thereby allows the pressure medium contained therein to flow into a pressure release chamber by way of the second orifice. The control member is so arranged that after the two hollow articles have been separated, it connects the fluid chamber to the source of the hydraulic pressure so that the control rod moves forward to ready the die body for the next blank to be processed.

The control member is appropriately a spring loaded, non-return valve. The control rod includes a radial follower flange located between the two said lateral orifices. The follower flange strikes the perforating die and presses it into its starting position during the forward motion of the control rod. The closing pressure of the non-return valve spring is set in such a way that the non-return valve opens under the influence of the pressure drop which at the same time occurs in the fluid chamber.

In contrast to the known prior art embodiments, the parts or portions to be separated are not supported during the separation process, with a cam which theoretically only provides the line contact. The new device can thus also be subsequently attached to those presses which possess an individual cam for each ejector motion but where these cams would be exposed to excessive load during the separation process.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DESCRIPTION OF SPECIFIC EMBODIMENTS

Figure 1:
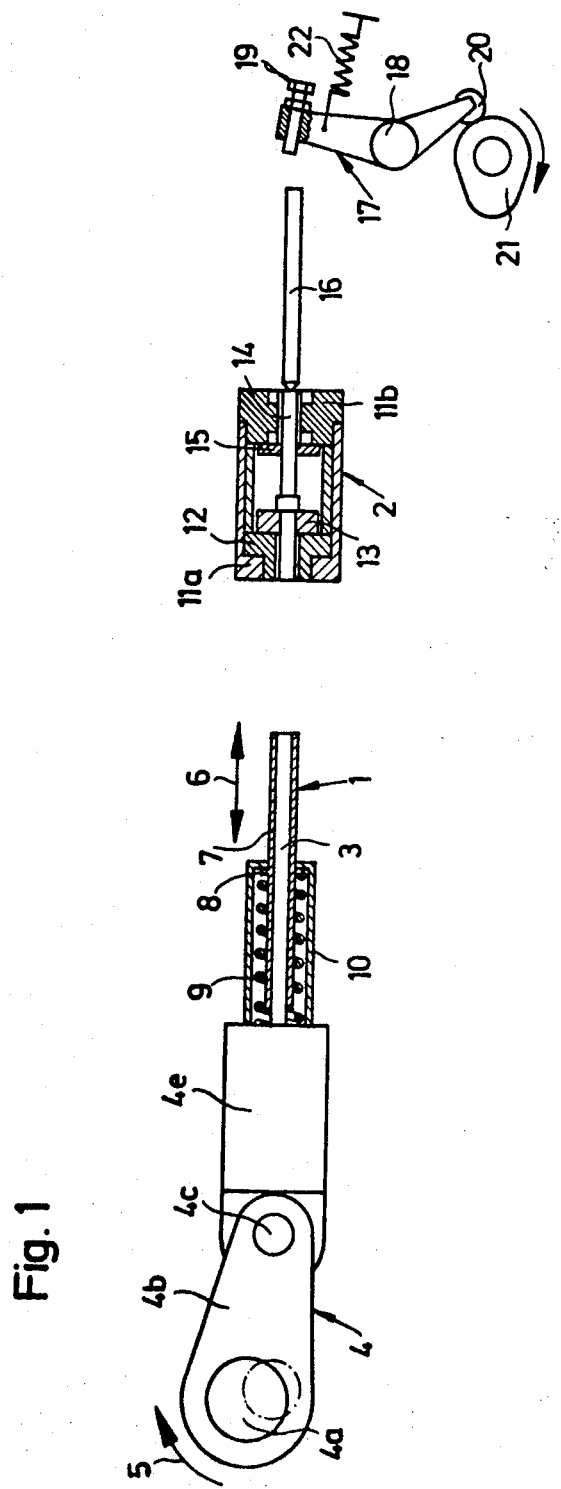
FIG. 1 is a schematic representation of a device made in accordance with this invention.

FIG. 1 schematically shows, without inessential details, a punch body, generally designated 1, and a die body, generally designated 2. The punch body 1 comprises a rod-shaped cutting punch 3 which is rigidly coupled to a crank drive 4. The crank drive 4 includes the crank pin 4a, crank web 4b, connecting-rod pin 4c and connecting-rod 4e and rotates in the direction indicated by the arrow 5. Thus, the crank drive 4 forces the punch body 1 to execute a reciprocating motion indicated by the double arrow 6.

A separating punch 7 which can slide axially is carried on the cutting or blanking punch 3. The separating punch 7 is in the shape of a sleeve and has an angular stop flange 8 in its middle region. A spiral spring 9 seeks constantly to press the stop flange 8 against the end face of a guide housing 10. In this end position, shown in FIG. 1, the front edge of the separating punch 7 is flush with that of the cutting punch 3.

The die body 2 is arranged coaxially with, and facing, the punch body 1. The die body 2 has a die housing 11a/11b, a separating die 12, a perforating die 13, a control rod 14, a non-return valve 15 and an ejector rod 16. The cranked lever 17 is provided for actuating the ejector rod 16. The lever 17 is mounted so as to swivel about the axis 18 and includes a setting screw 19 at one end and a loose roller 20 at the other. The roller 20 rolls over the periphery of a cam disc 21 and is kept in constant contact with the cam disc 21 by a spring 22.

The function and mode of action of these components can be seen from the larger-scalere presentations of cross-sections according to the FIGS. 2 through 6. Only the middle section of the device is shown in the drawings and the drive mechanisms which are in themselves known are omitted.

Figure 2:
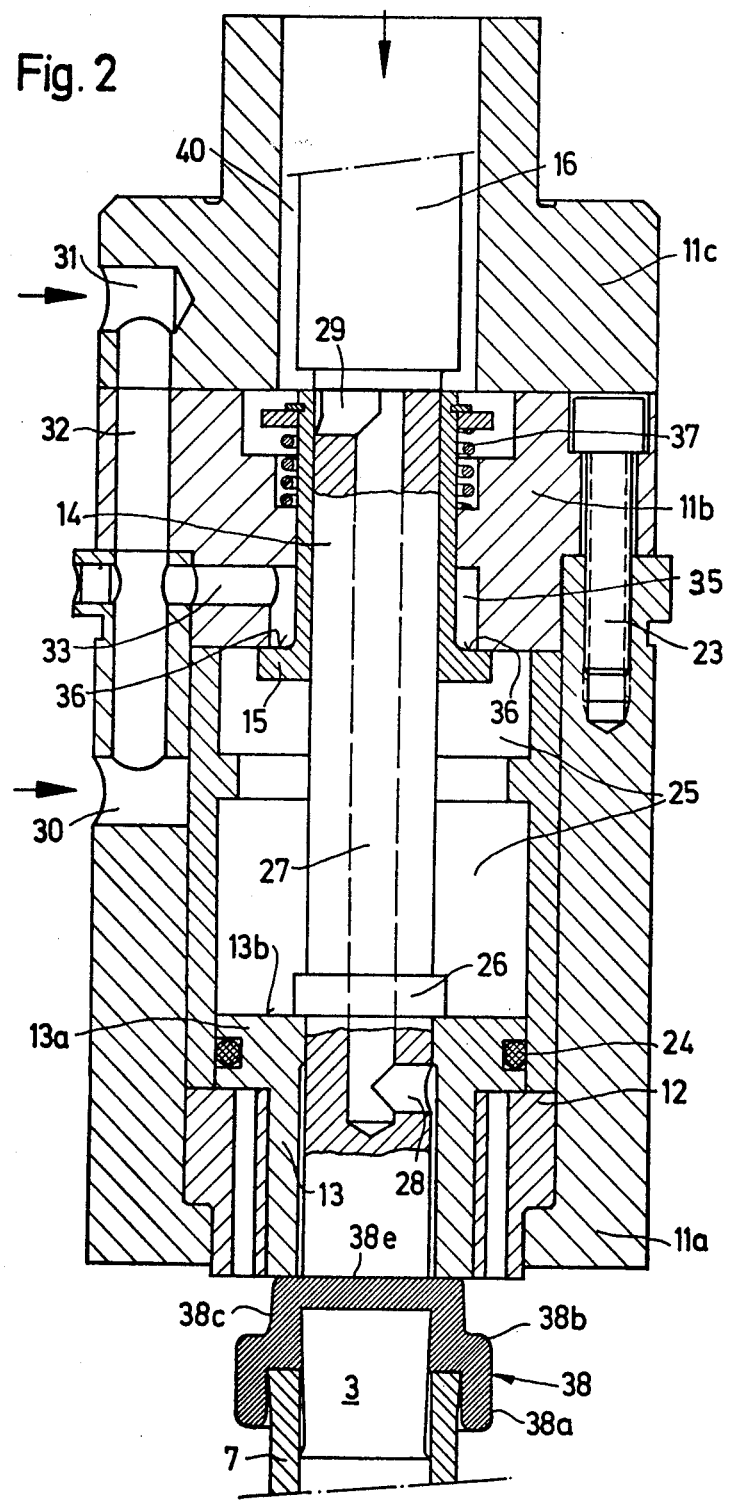
FIGS. 2 to 6 illustrate the operation of the device in various working stages.

As FIG. 2 shows, the two parts 11a and 11b of the die housing are connected to one another by means of screws 23. In the front region of the die housing there is the separating die 12 having a bore which carries the perforating die 13 so that it can slide axially. The cross-section of the sleeve-shaped perforating die 13 is practically T-shaped and includes the annular flange 13a being sealed by an O-ring 24, against the wall of a fluid chamber 25.

The control rod 14 can slide in the bore of the perforating die 13. The control rod 14, which in FIG. 1 is shown in its frontmost end position, consists of a round rod which in its front region has stop flange 26 and a coaxial longitudinal bore 27. The longitudinal bore 27 is connected to the periphery of the control rod 14 via three lower and three upper transverse bores 28 and 29, respectively. The upper transverse bores 29 ends in a pressure release chamber 40 which surrounds the ejector rod 16.

The die housing 11a/11b/11c has two inlet bores 30 and 31, which are connected to one another via a bore 32 and are connected to a hydraulic installation, for example the cooling water system of the press, which is not shown. The hydraulic medium, for example cooling water under a pressure of 1.4 atmospheres gauge, flows in the direction of the arrow into the two inlet bores 30 and 31 and passes via a connecting bore 33 into the chamber 35 located above the non-return valve 15. The non-return valve 15 is pressed by a spiral spring 37, in cooperation with the pressure prevailing in the chamber 25, against a seat 36 provided in the housing section 11b and in this position prevents the hydraulic medium from flowing from the fluid chamber 25 into the space 35, and vice versa.

In principle, the non-return valve 15 could also operate without the spiral spring 37. In this case, valve 15 would always only be actuated by the excess pressure acting from one side. In the absence of the spiral spring 37, the non-return valve 15 would thus close as soon as the pressure prevailing in the space 25 would exceed that of the space 35.

The blank 38 which is to be perforated and separated comprises, as is shown by FIG. 2, a stepwise arrangement of a hollow article 38a which is connected via a strip 38b to a smaller hollow article 38c. The free end face 38e of the smaller hollow article 38c is a continuous closed surface. To manufacture two rings which can for example be used as roller bearing rings, it is necessary on the one hand to separate the two hollow articles 38a and 38c from one another by shearing off the strip 38b. The small hollow article 38c has to be perforated by punching out the end face 38e.

In the stage of the perforating and separating process shown in FIG. 1, the blank 38 is clamped between the end faces of the perforating punch 3 and of the control rod 14. The crank drive 4 which moves the perforating punch 3 is approximately in the position shown in FIG. 1 and thus has the tendency to force the perforating punch 3 at the next moment into the bore of the perforating die 13. The separating punch 7, to which a load is applied by the spring 9 (FIG. 1), rests on the inner shoulder of the blank 38.

Figure 3:
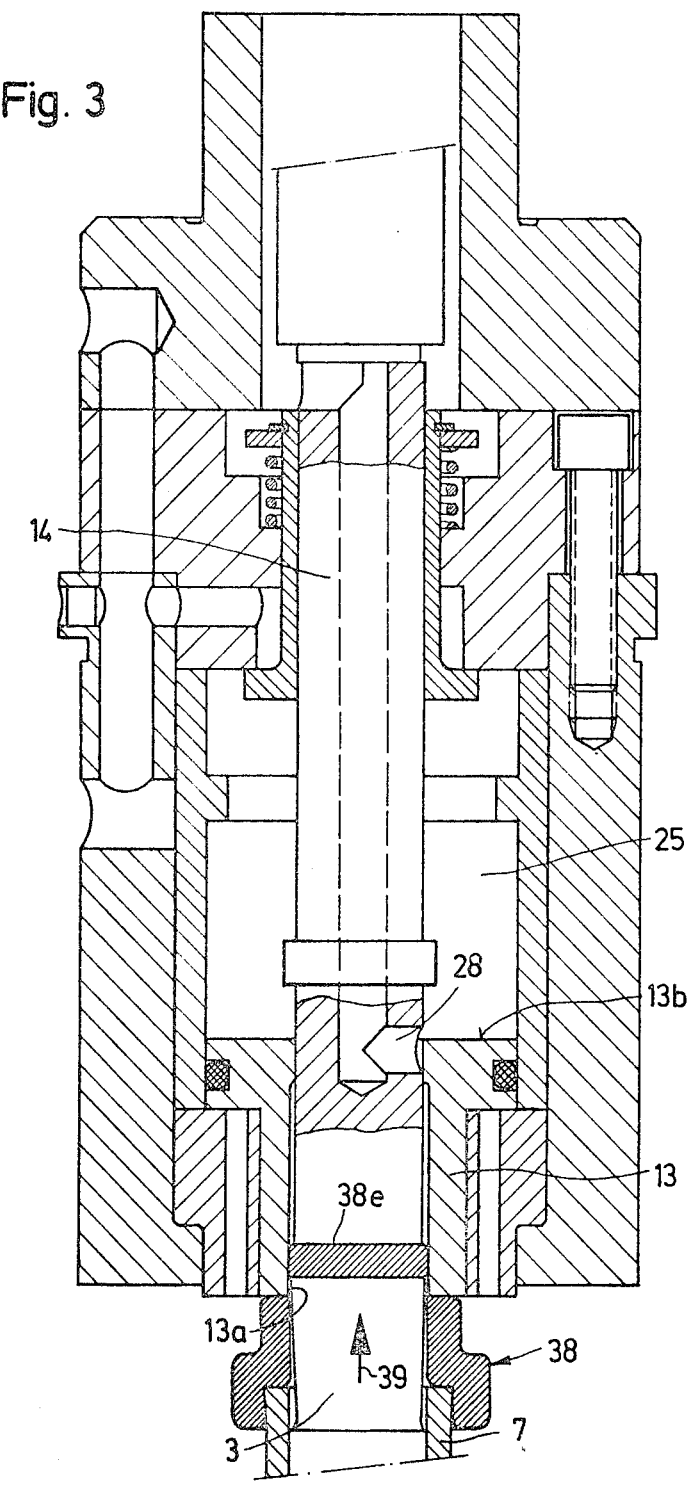

According to FIG. 3, the perforating punch 3 entering the perforating die 13 in the direction of the arrow 39 has punched out the end face 38e of the blank in cooperation with the circular shearing edge 13a of the perforating die 13. Now punch 3 pushes the circular disc-shaped punched-out body in front of it. The control rod 14 is at the same time forced back by the perforating punch 3 into the interior of the die housing. In doing so, the orifice of the transverse bore 28 slides along the inner wall of the bore of the perforating die 13 until it reaches the position shown in FIG. 3, and is hence kept closed. The medium contained in the fluid chamber 25 can thus not yet escape and the perforating die 13 cannot give way under the punch pressure since the pressure prevailing in the fluid chamber 25 acts on the annular surface 13b of the perforating die 13. The advancing connecting rod 4e (FIG. 1) thus initially only compresses the spring 9.

Figure 4:
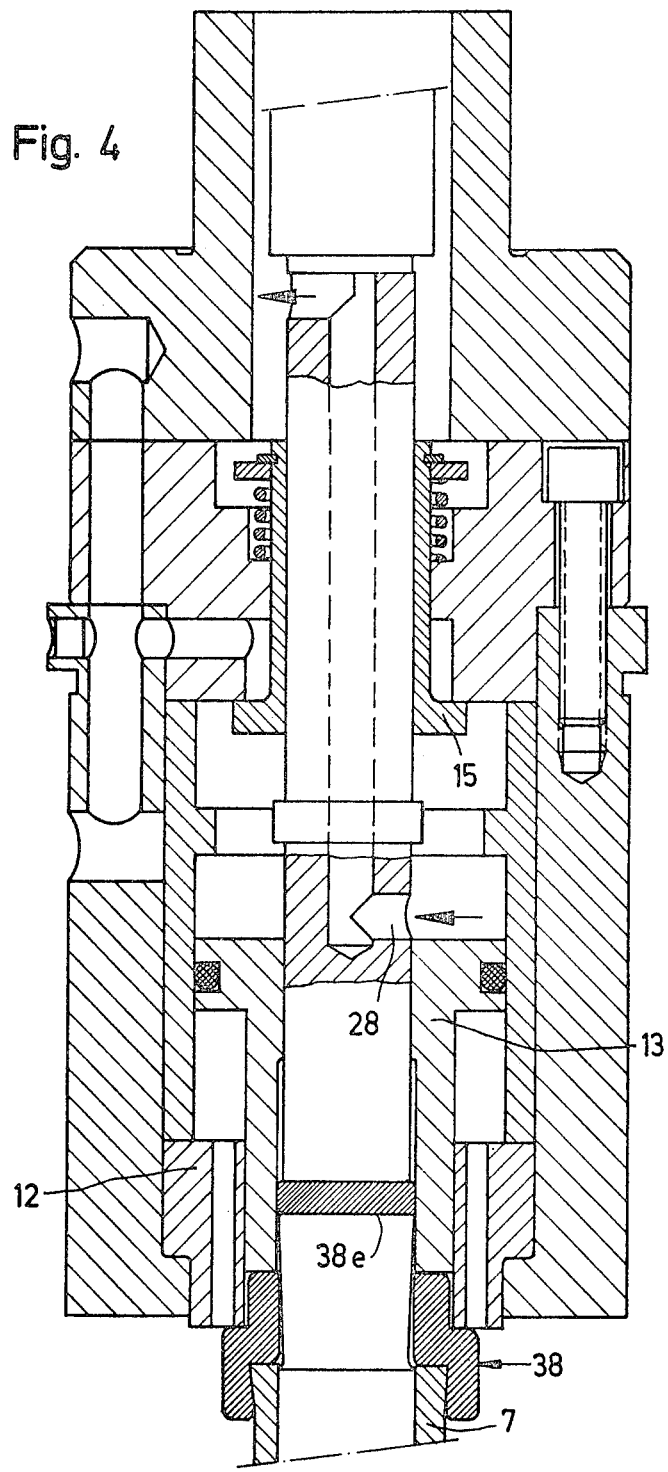

However, as soon as the front edge of the connecting rod 4e strikes the end face of the separating punch 7 which faces the connecting rod 4e (FIG. 1), the separating punch 7 is forcibly carried with it. In this phase, the orifice of the transverse bore 28 already projects somewhat in the fluid chamber 25. Therefore, the medium contained in chamber 25 can flow through the longitudinal bore 27 into the pressure release chamber 40. The separating punch 7 thus continues to push the perforated blank 38 in front of it until the position shown in FIG. 4 is next reached. In this position, the outer shoulder of the blank 38 rests on the annular end face of the fixed separating die 12. Since the separating punch 7 however is forced to continue its movement, the smaller hollow article 38c is now sheared off through the cooperation of the two annular shear edges of the separating punch 7 and of the separating die 12. After the shearing-off process, the individual parts of the blank 38 are in the position shown in FIG. 5.

During the entire advance of the separating punch 7, the perforating die 13 was thus pushed back while displacing the fluid contained in the chamber 25. The non-return valve 15 having been kept closed by virtue of the excess pressure prevailing in the chamber 25. The non-return valve 15 retains its closed position if the force $P_1$ acting from the chamber 35 on the annular surface 15a is at least equal to the sum of the force $P_2$ acting on the underside 15b of the non-return valve and the closing force of the spring 37 (FIG. 5).

Figure 5:
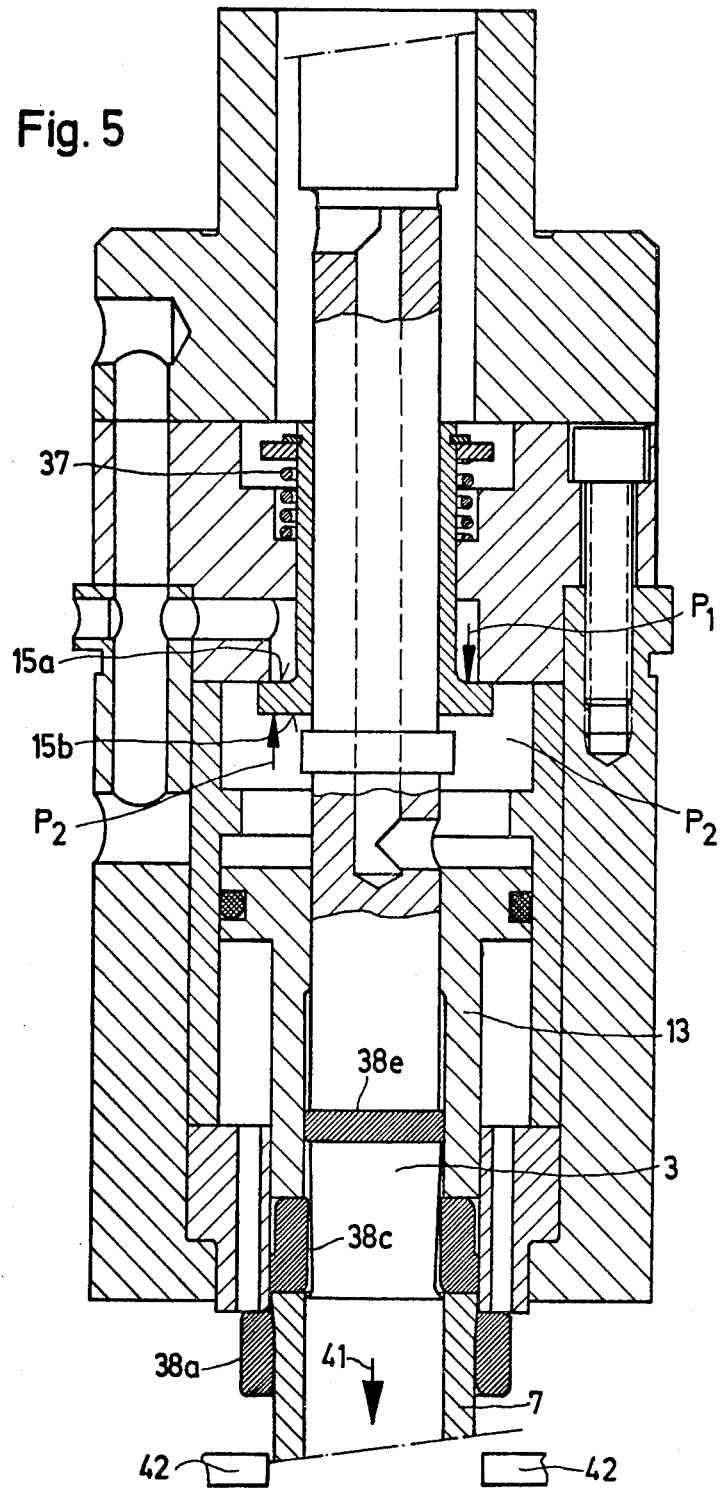
Figure 6:
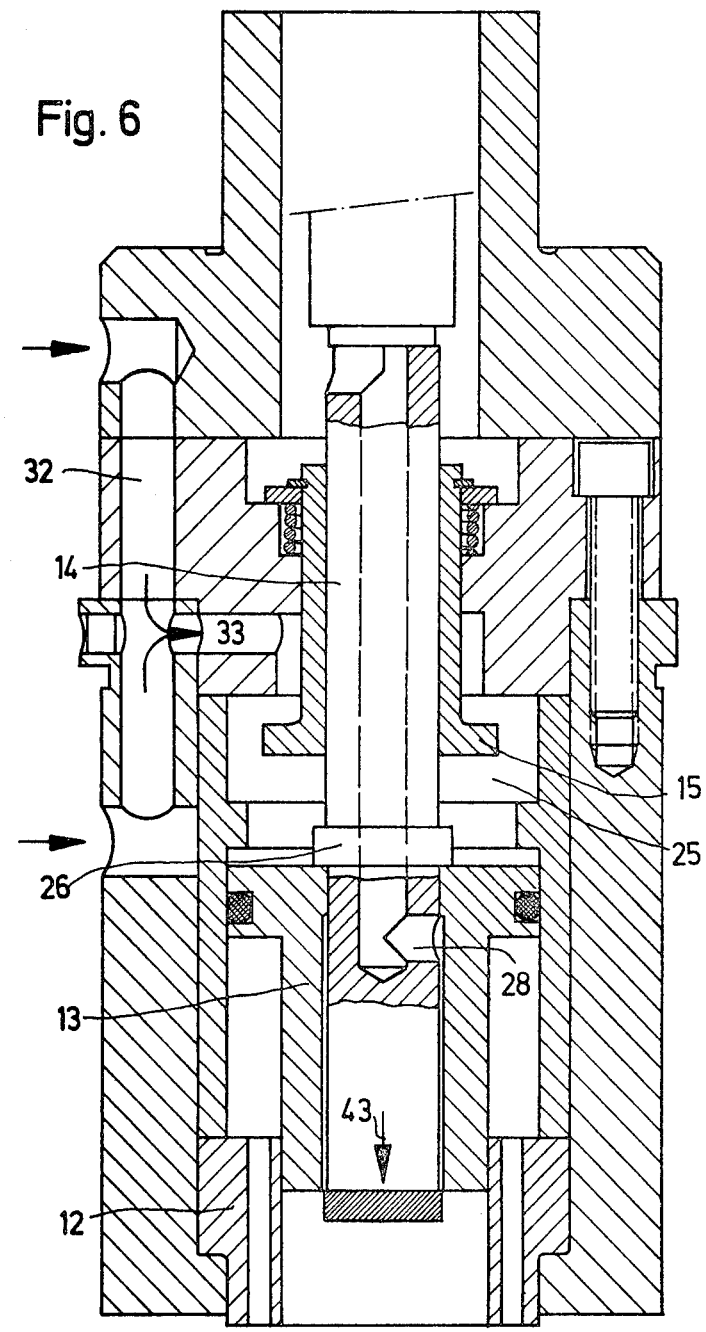

After reaching the phase shown in FIG. 5, the punch body 1 retracts, in the direction of the arrow 41, under the influence of the crank mechanism 4 and, in doing so, takes the two sections 38a and 38c of the blank with it. The section 38a is then stripped off by means of a stripper device 42 located in the retraction region of the separating punch 7 and falls downwardly. The section 38c is stripped off as soon as the separating punch 7, under the influence of the spring 9 (FIG. 1), again pushes over the front section of the perforating punch 3.

The punched article 38e left in the die body 2 is subsequently pushed out by a movement of the control rod 14 in the direction of the arrow 43. During this forward motion of the control rod 14, caused by the control cam 21, the flange 26 immediately strikes the end face of the perforating die 13 which faces it and pushes the latter back again into its starting position according to FIG. 1. During the displacement of the perforating die 13, a reduced pressure is caued in the fluid chamber 25. Therefore, the non-return valve 15 releases the inflow and the pressure medium flows via the pipelines 32 and 33 into the fluid chamber 25. The pressure fluid cannot flow away since, in this position, the transverse bore 28 is again already covered.

The device is thus ready for the next punching and separating process.

While the device for manufacturing a pair of annular members from a preformed blank has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. In an apparatus for effecting the perforation in a preformed blank wherein the apparatus includes a reciprocatible punch body and a die body operatively associated with the punch body, the combination comprising:
   a. an axially movable perforating die member carried within said die body,
   b. a fixedly mounted outer die member being annularly disposed with respect to the perforating die member,
   c. a perforating punch carried by the punch body and being adapted to cooperate with the perforating die to perforate the preformed blank,
   d. hydraulic control means adapted to maintain the perforating die at an initial stationary position against axial displacement effective support said blank during perforation thereof and to permit relative axial displacement between the perforating die member and the outer die member at another time during the operating cycle of the apparatus, and
   e. ejector means for moving the perforating die member to the initial stationary position after having been displaced with respect to the outer die member.

2. The combination as defined in claim 1 wherein said hydraulic control means includes a fluid chamber and a control valve member,
said fluid chamber being adapted to supply fluid pressure to the surface of the perforating die member which is remote from the perforating punch,
said control valve member being disposed between a source of hydraulic pressure and the fluid chamber to regulate the supply of fluid pressure to the fluid chamber.

3. The combination as defined in claim 1 wherein said hydraulic control means includes a fluid chamber, a control valve member, and a pressure release chamber,
said fluid chamber being adapted to supply fluid pressure to the surface of the perforating die member which is remote from the perforating punch,
said control valve member being disposed between a source of hydraulic pressure and the fluid chamber to regulate the supply of fluid pressure to the fluid chamber,
said ejector means includes a rod that is displaceable in the bore of the perforating die member,
said rod has a longitudinal bore provided with two lateral orifices,
one of said orifices being arranged nearer to the end of the rod which is adjacent the perforating die member whereby said orifice is adapted to be closed by the wall of the bore of the perforating die member during the perforating operation and to be connected to said fluid chamber after perforating the preformed blank to allow the pressure medium therein to flow via the other said orifice into the pressure release chamber.

4. The combination as defined in claim 3 wherein the rod includes a radial follower flange disposed between said orifices and adapted to strike the perforating die member and thereby press the perforating die member to the initial stationary position during movement of the control rod toward said punch body.

5. The combination as defined in claim 3 wherein the control valve member is arranged so that is connects the fluid chamber to the source of hydraulic pressure while the ejector means is moving the perforating die member to said initial stationary position.

6. The combination as defined in claim 5 wherein the control valve member comprises a spring-loaded non-return valve,
said spring loading of the non-return valve is adapted to allow said valve to open under the influence of the pressure drop which occurs during the movement of the perforating die member to said stationary position.

7. The combination as defined in claim 1 wherein the preformed blank is in the form of a cup-shaped inner portion integral with and axially displaced with respect to an outer annular portion,
said punch body includes a separating punch mounted coaxially with the perforating punch,
said separating punch and said outer die member being adapted to cooperate with each other to separate the inner and outer portions of the preformed blank.

8. The combination as defined in claim 7 wherein the perforating punch and said perforating die member are adapted to cooperate with each other to perforate the inner cup-shaped portion of the preformed blank.

9. The combination as defined in claim 8 wherein said hydraulic control means includes a fluid chamber, a control valve member and a pressure release chamber,
said ejector means includes a rod that is displaceable in the bore of the perforating die member, said rod has a longitudinal bore provided with two lateral orifices and a radial follower flange disposed between said orifices, one of said orifices being arranged nearer to the end of the rod which is adjacent the perforating die member whereby said orifice is adapted to be closed by the wall of the bore of the perforating die member during the perforating operation and to be connected to said fluid chamber after perforating the die to allow the pressure medium therein to flow via the other said orifice into the pressure release chamber, said follower flange being adapted to strike the perforating die member and thereby press the perforating die member to the initial stationary position during movement of the ejector rod towards said punch body.

10. The combination as defined in claim 9 wherein the control valve member is arranged so that is connects the fluid chamber to the source of hydraulic pressure while the ejector means is moving the perforating die member to said initial stationary position, the control valve member comprises a spring-loaded non-return valve, said spring loading of the non-return valve is adapted to allow said valve to open under the influence of the pressure drop which occurs during the movement of the perforating die member to said stationary position.

* * * * *